Figure 1:
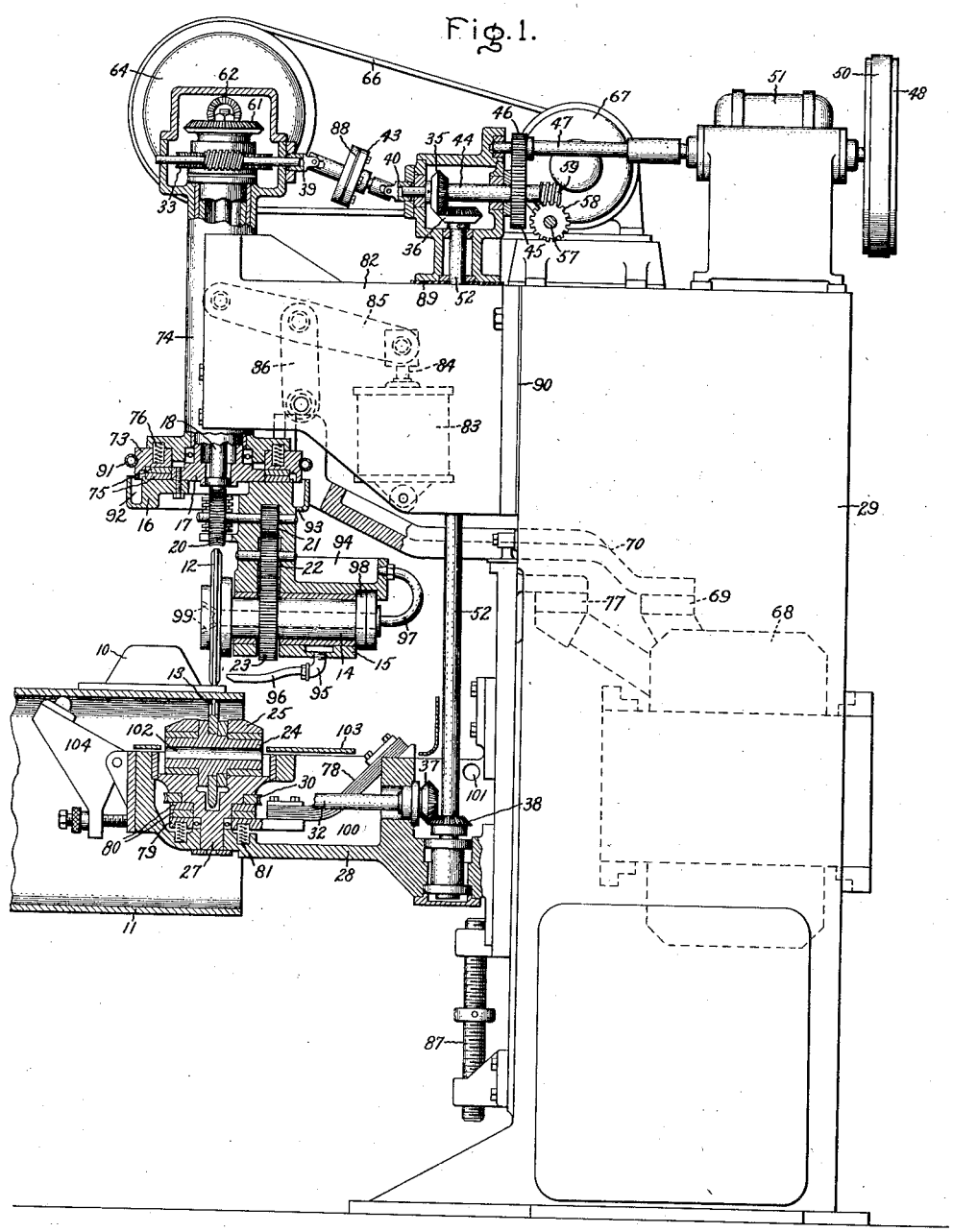

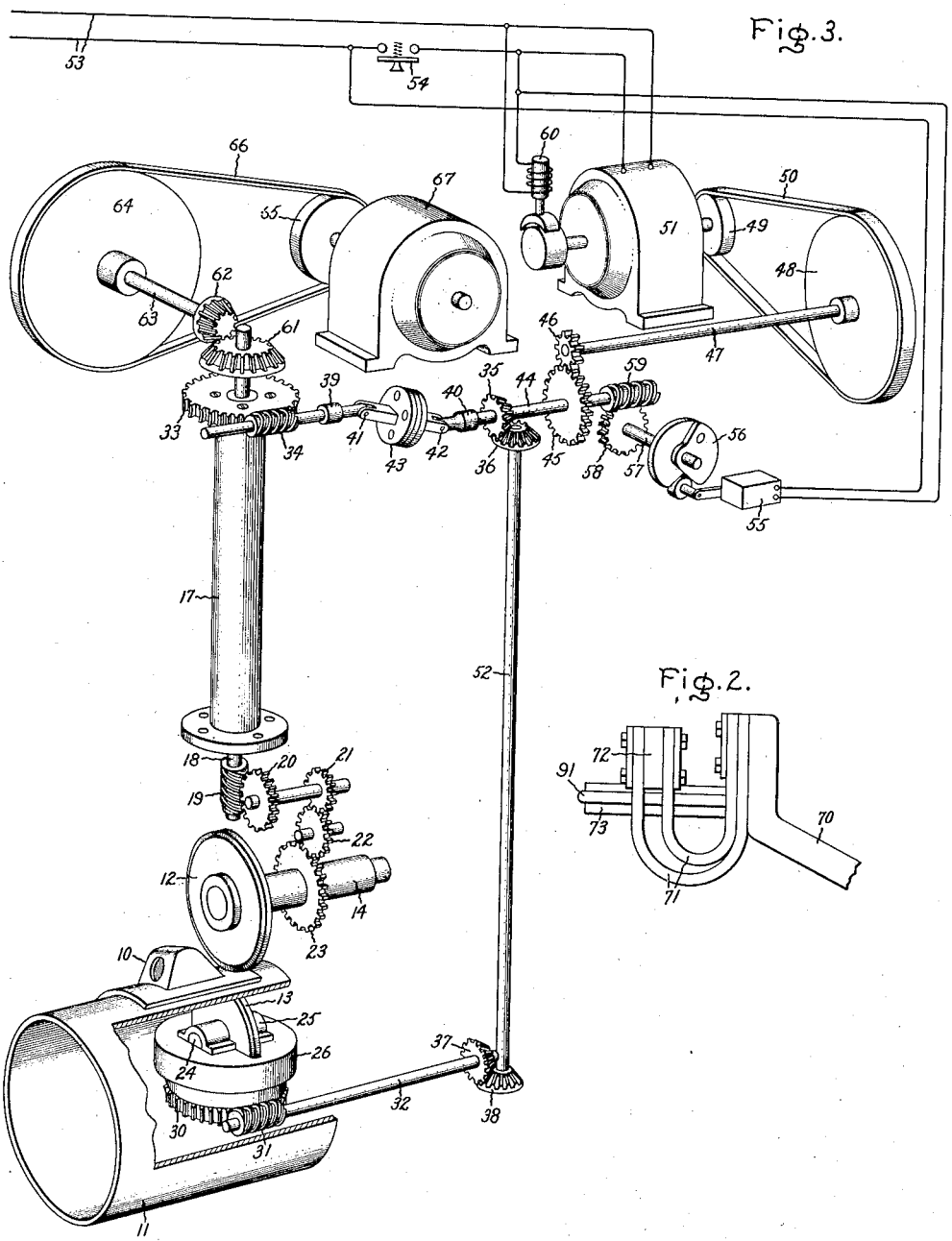

Patented May 7, 1940

2,200,112

UNITED STATES PATENT OFFICE 2,200,112

RESISTANCE LINE WELDING MACHINE

Ralph A. Gilbert, Pittsfield, Mass., assignor to General Electric Company, a corporation of New York Application December 1, 1938, Serial No. 243,369

14 Claims. (Cl. 219—4)

My invention relates to resistance line welding machines.

For certain welding operations it is possible to set the roller electrodes of a line welding machine for rotation in a given plane and weld along any desired straight or curved path by imparting to the work certain translatory and rotary motions relative to the electrodes. Frequently, however, a rotary motion cannot be imparted to the work because of interference between the work and the welding machine. For example, in welding bushing pockets to transformer tanks the transformer tank can be supported over one of the electrode supporting arms of the welding machine and given a translatory movement along the electrode arm or a turning motion about it but no or only a very limited turning movement can be imparted to the tank about an axis passing through the point of engagement of the electrodes with the tank. Consequently, in welding a pocket to a transformer tank, it has in the past been necessary to make a plurality of intersecting welds extending along and around the tank in order to obtain a welded union that extends around the opening in the tank over which the pocket is located. It has been found that where these welds intersect, leaks often occur showing that imperfect joints have been obtained at these points.

It is an object of my invention to provide a line welding machine in which during welding the roller electrodes may be turned bodily about their point of engagement with the work whenever such an operation is required. Thus in welding a bushing pocket to a transformer tank when it is not possible to rotate the tank relative to the electrodes, the electrodes may be rotated relative to the tank and it is thus possible to make a single continuous weld that extends about the opening in the tank over which the pocket is located.

It is also an object of my invention to provide a particular arrangement of parts for accomplishing this turning movement of the electrodes relative to the work.

Another object of my invention is to provide an arrangement in which the electrodes are turned through a predetermined angle of displacement once the turning motion has been initiated.

It is also an object of my invention to provide an improved electrode cooling system which is particularly suited for line welding machines in which the roller electrodes are bodily turned about their point of engagement with the work.

Other objects of my invention will become apparent from a consideration of the embodiment thereof illustrated in the accompanying drawings.

In these drawings, Fig. 1 is a side view, partly in section, of a line welding machine embodying my invention; Fig. 2 is a detail view of a portion of the machine of Fig. 1; and Fig. 3 is a schematic view showing the mechanical drive and control by means of which the electrodes are turned relative to the work through a predetermined angle of displacement once the turning operation has been initiated.

In the drawings, a bushing pocket 10 is being welded to a transformer tank 11 by means of roller electrodes 12 and 13. These electrodes are supported for rotation about axes substantially parallel with one another and the work inserted therebetween, and means are provided for simultaneously turning these electrodes in the same direction through the same angular displacement about an axis perpendicular to the work at their point of engagement therewith.

Upper electrode 12 is supported on an axle 14 which is mounted in a bearing 15 formed integrally with the bearing support 16. This bearing support is attached to the lower end of a hollow shaft 17. Extending through the hollow shaft 17 and concentric therewith is another shaft 18 which is gear connected to the axle 14 on which the electrode 12 is supported. This gear connection comprises a worm 19, a worm wheel 20, and spur gears 21, 22 and 23. Worm wheel 20 and spur gears 21, 22 and 23 are mounted in the bearing support 16 and turn therewith about the worm 19 when a rotary motion is imparted to the outer concentric shaft 17 on which the bearing support is mounted.

The lower electrode 13 is supported for rotation on axle 24 which is mounted in a bearing 25 supported on a turntable 26. This turntable is supported for rotation about a bearing 27 in an arm 28 extending from the frame 29 of the welding machine. The turntable 26 is provided with a worm wheel 30 which engages a worm 31 mounted on a shaft 32.

The shaft 17 for turning the upper electrode 12 and the shaft 32 for turning the lower electrode 13 are mechanically connected through worm wheel 33, worm 34, gears 35, 36 and gears 37, 38. The worm wheel 33 is supported on the upper end of the shaft 17 and is engaged by the worm 34 which is connected to gear 35 through shafting including extensible couplings 39 and 40, universal joints 41 and 42, and a coupling 43. Gear 35 is mounted on a shaft 44 which is connected through spur gears 45, 46, shaft 47, pulleys 48, 49, and belt 50 to the rotating element of an electric motor 51. Gears 36 and 38 are connected by a shaft 52. It is thus apparent that the rotation of the shaft 44 by the motor 51 imparts simultaneous rotation to the hollow shaft 17 and the turntable 26 and, consequently, to the upper electrode 12 and the lower electrode 13.

The electric motor 51 is connected through a control circuit to a source of supply 53. As illustrated in Fig. 3 of the drawings, one terminal of the source of supply 53 is connected directly to the motor and the other terminal is connected thereto through the agency of a control switch 54. This control switch is shunted by a second control switch 55 which is actuated by an adjustable cam 56 having a rotation proportional to the turning motion of the electrodes 12 and 13. As illustrated in Fig. 3 of the drawings, the cam 56 is connected through a shaft 57, a worm wheel 58, and a worm 59 to the shaft 44 which is driven by the motor 51. The arrangement is such that once the motor 51 is energized through the control switch 54, it is maintained energized through the cam operated switch 55 until a predetermined turning movement has occurred. This predetermined turning movement is determined by the adjustment of the cam 56 which eventually allows the cam operated switch 55 to open and disconnect the motor 51 from the source of supply 53. Excessive coasting of the motor and the means connected therewith for turning the electrodes is prevented by suitable means such as an electric brake 60. The operating coil of this brake is connected in shunt to the motor 51 so that it is energized and the brake released as soon as the motor is energized and so that it is deenergized and the brake applied as soon as the motor is deenergized. Other arrangements may be substituted for the brake 60 for preventing coasting of the parts. For example, the connections of the motor may be momentarily reversed. Since the inertia of moving parts is the same it is not necessary to provide a brake or similar arrangement to prevent coasting of the turning means since by proper adjustment of the cam 56 the electrodes may be brought to rest in any desired position.

Due to the nature of the gearing employed, it is not necessary to lock the electrodes 12 and 13 against turning movement. If, due to a different type of transmission, it is found necessary to hold the electrodes in adjusted position, a brake such as that illustrated in the drawing will accomplish this purpose.

The electrodes 12 and 13 are rolled along the work by imparting rotation to the upper electrode 12 through the inner concentric shaft 18 gear connected therewith. The upper end of shaft 18 is connected through gears 61, 62, shaft 63, pulleys 64 and 65, and belt 66 to the rotating element of an electric motor 67. The control circuit for electric motor 67 has not been illustrated. Ordinarily it comprises a switch for energizing and deenergizing the motor.

The belt drives employed with motors 51 and 67 may be of the adjustable type in which the active diameter of the pulleys relative to one another are adjustable while the pulleys are in rotation. This makes possible an accurate adjustment of the welding speed as well as the speed at which the electrodes are bodily turned relative to the work.

Welding current is supplied to the electrodes from a welding transformer 68 mounted within the frame 29 of the welding machine.

Terminal 69 of this welding transformer is connected through a bar connector 70, flexible straps 71 (Fig. 2) and lugs 72 attached at diametrically opposite points to a conducting ring 73. This conducting ring is supported at the lower end of a slide 74 within which the concentric shafts 17 and 18 are also supported. It makes an electrical contact with the upper end of bearing support 16 through contact rings 75. A desired contact pressure is maintained between contact rings 75 through the agency of springs 76 located between the lower end of shaft 17 and conducting ring 73. Current passes from rings 75 through the bearing support 16, bearing 15, and axle 14 to the electrode 12.

The other terminal 77 of the welding transformer 68 is connected to the frame 29 of the welding machine. The lower arm 28 in which the electrode 13 is mounted is adjustably bolted to the frame 29 of the machine and is consequently in conductive engagement therewith. The circuit is completed through an electrical connection 78 to a conducting ring 79 associated with the lower electrode 13. This conducting ring encircles the bearing 27 for the turntable 26 and through contact rings 80 makes an electrical contact with the turntable 26 through contact rings 80. The conducting ring 79 is spring biased into engagement with the contact rings 80 by means of springs 81 located between the conducting ring 79 and the arm 28 of the welding machine. The turntable 26, bearing 25 and axle 24 are made of conducting material for supplying welding current from the contact rings 80 to the electrode 13.

As pointed out above, the electrode 12 is supported on a sliding member 74. This slide is mounted for vertical movement in the upper arm 82 of the welding machine. The slide is operated through the agency of a cylinder 83 and piston (not shown) reciprocatingly mounted therein. This piston is connected through a piston rod 84 and a link 85 to the slide 74. The link 85 is supported in the arm 82 by a connecting link 86 which serves as a pivoted fulcrum therefor. By properly controlling the supply of operating fluid to the cylinder 83, the slide 74 may be lowered or raised to bring the upper electrode 12 into or out of engagement with the work. The extensible couplings 39 and 40 and universal joints 41 and 42 forming part of the gearing above described permit this vertical movement of the slide without interfering with the driving connection established between the motor 51 and the hollow shaft 17 which is supported in the slide. The shaft 18 and its drive 61, 62, 63 and 64 also supported in the slide is free to move in a vertical direction by reason of the belt drive connecting the motor 67 therewith.

The position of the lower electrode 13 may be adjusted relative to the position of the upper electrode 12 by means of an adjusting screw 87. This screw which is connected between the main frame of the welding machine and the lower arm 28 thereof is effective for raising or lowering the arm 28 relative to the main frame of the machine.

An insulating disk 88 in the coupling 43, an insulating washer 89 between the arm 82 and the upper bearing for shaft 52, and an insulating strip 90 between the arm 82 and main frame of the welding machine provide the necessary insulation between the upper electrode 12 and the lower electrode 13.

The electrodes 12 and 13 and their supporting means through which welding current is supplied thereto are maintained at a desired operating temperature by means of a particular cooling system.

The electrode 12 and the current conducting parts associated therewith are cooled by liquid supplied to a conduit 91 in thermal engagement with the conducting ring 73. This conduit encircles the conducting ring 73 and discharges liquid into a liquid retaining depression 92 formed in the upper portion of the bearing support 16. Liquid is discharged from this depression through a passageway 93 into a liquid retaining depression 94 formed in the top portion of the bearing 15. A passageway 95 encircling the bearing for the axle 14 communicates with the depression 94 and supplies liquid to a conduit 96 through which liquid is supplied to the electrode 12 near its point of engagement with the work. Liquid is also supplied from the depression 94 through a conduit 97 to a longitudinally extending passageway 98 in the axle 14. Liquid supplied to this passageway is discharged therefrom through passageways 99 and spills over the electrode 12.

The lower electrode 13 and the current conducting parts associated therewith are cooled by liquid supplied to a depression 100 in the lower arm 28. The liquid is maintained at a desired level in this depression by means of an outlet 101. This level is sufficiently high to supply liquid to the longitudinal passageway 102 in the axle 24 on which the electrode 13 is mounted. The lower part of the electrode 13, the turntable 26 conducting ring 79, contact rings 80, and conductor 78 are all immersed in the liquid contained in the depression 100. A cover 103 may be provided for closing the depression 100 and preventing dirt, scale and the like from falling therein.

In the machine illustrated, a work support 104 cooperates with the lower electrode 13 in holding the work in desired position between the welding electrodes 12 and 13. This work support comprises a bracket pivotally attached to the outer end of the lower arm 28 of the welding machine. It is provided with a work engaging portion which is adjustable vertically by means of a screw extending between the bracket and the arm 28 of the machine. It is, of course, apparent that such a work support is not essential and that other types of work supports may be employed whenever considered necessary.

The machine described above operates in the following manner: When welding the bushing pocket 10 to a transformer tank 11 the bushing is conveniently positioned on the tank by means of a few spot welds and the assembly then positioned in the machine as illustrated in the drawings. The assembly rests on the lower electrode 13 and the work support 104, and the upper electrode 12 is brought into welding engagement therewith by moving the slide 74 in a downward direction through the agency of cylinder 83 and its piston which is connected with the slide through link 85. Continuous rotation is imparted to the electrode 12 by the motor 67 and the rotation of this electrode feeds the work between it and its cooperating electrode 13. When one side of the pocket 10 has been welded to the tank 11 the electrodes 12 and 13 are bodily turned while the welding operation is in progress by closing the switch 54. This switch energizes the motor 51 which through the gearing above described turns the electrodes 12 and 13 in the same direction at the same rate through the same angular displacement about an axis perpendicular to the work. In the particular instance under consideration these electrodes are turned through an angle of 90°. This turning movement is arrested by the opening of cam switch 55 which is set through the agency of its adjustable cam 56 to accomplish this 90° rotation once the rotary movement has been initiated. Welding then proceeds along another side of the pocket until it is necessary to again bodily turn the electrodes by closing the switch 54. By proper manipulation of the switch 54 while the work is moving along and around arm 28 of the welding machine, a continuous weld completely encircling the opening is made about all four sides of the bushing pocket.

The particular cooling system above described adequately cools the current conducting electrodes and their current conducting supports and allows for the turning movement thereof.

It is, of course, apparent that the machine above described is suitable for other welding operations than that described. For example, the electrodes may be turned through any desired angle to form arcuate welds of any desired length. Under certain circumstances, the electrodes may be turned through 360 electrical degrees to complete a circular weld. Many uses for the machine above described will suggest themselves to those skilled in the art and it is considered unnecessary to point out in greater detail the potentialities of applicant's machine.

Since certain changes may be made in the machine above described and since different embodiments of the invention incorporated therein may be made by those skilled in the art in view of the above disclosure, it is intended to cover in the appended claims all those modifications and variations of my invention which fall within the true spirit and scope thereof.

What I claim as new and desire to secure by Letters Patent of the United States, is:

1. A resistance line welding machine comprising cooperating electrodes adapted to make a rolling engagement with the work inserted therebetween, means for rolling said electrodes along the work, and means for bodily turning said electrodes in the same direction through the same angular displacement about their point of engagement with the work.

2. A resistance line welding machine comprising cooperating electrode rolls supported for rotation about axes substantially parallel with one another and the work inserted therebetween, means for rotating at least one of said electrodes, and means for simultaneously turning said electrodes in the same direction through the same angular displacement about an axis perpendicular to the work at the point of engagement of said electrodes with the work.

3. A resistance line welding machine comprising a slide, inner and outer concentric shafts supported on said slide, a roller electrode, an axle on which said roller electrode is supported, a bearing for said axle supported on one end of said outer concentric shaft, means for transmitting the rotation of said inner concentric shaft to said axle, said means including a worm supported on said inner shaft and a worm wheel connected with said axle, means for rotating said inner concentric shaft, and means for rotating said outer concentric shaft.

4. A resistance line welding machine comprising electrodes adapted to make a rolling engagement with the work inserted therebetween, means for rolling said electrodes along the work, means including a motor for bodily turning both of said electrodes in the same direction about their point of engagement with the work, means for energizing said motor, and means responsive to the movement of said turning means for maintaining the energization of said motor until said electrodes have been turned through a predetermined angle of displacement.

5. A resistance line welding machine comprising a slide, inner and outer concentric shafts supported on said slide, a roller electrode, an axle on which said roller electrode is supported, a bearing for said axle supported on one end of said outer concentric shaft, means for transmitting the rotation of said inner concentric shaft to said axle, said means including a worm supported on said inner shaft and a worm wheel connected with said axle, a second roller electrode, a second axle on which said second roller electrode is supported, a second bearing for said second axle, a turntable on which said second bearing is supported, means for simultaneously rotating in the same direction through the same angular displacement said outer concentric shaft and said turntable, and means for rotating said inner concentric shaft to impart rotation to said first mentioned roller electrode.

6. A resistance line welding machine comprising a slide, inner and outer concentric shafts supported on said slide, a roller electrode, an axle on which said roller electrode is supported, a bearing for said axle supported on one end of said outer concentric shaft, means for transmitting the rotation of said inner concentric shaft to said axle, said means including a worm supported on said inner shaft and a worm wheel connected with said axle, a second roller electrode, a second axle on which said second roller electrode is supported, a second bearing for said second axle, a turntable on which said second bearing is supported, means including a motor for simultaneously turning said outer concentric shaft and said turntable in the same direction at the same angular velocity, means for energizing said motor, and means responsive to the movement of said turning means for maintaining the energization of said motor until a predetermined turning movement has been obtained.

7. A resistance line welding machine comprising an electrode adapted to make a rolling engagement with the work to be welded, means including a motor for bodily turning said electrode about its point of engagement with the work, means for energizing said motor, and means responsive to the movement of said turning means for maintaining the energization of said motor until said electrode has been turned through a predetermined angle of displacement.

8. A resistance line welding machine comprising an electrode adapted to make a rolling engagement with the work to be welded, means including a motor for bodily turning said electrode about its point of engagement with the work, means for energizing said motor, means responsive to the movement of said turning means for maintaining the energization of said motor until said electrode has traveled through a predetermined angle of displacement and thereafter deenergizing said motor, and means for promptly arresting the movement of said motor and said turning means upon the deenergization of said motor.

9. A resistance line welding machine comprising an electrode adapted to make a rolling engagement with the work to be welded, means including an electric motor for bodily turning said electrode about its point of engagement with the work, an adjustable cam having a movement proportional to the movement of said turning means, a control circuit for said motor, a source of supply, means for momentarily connecting said control circuit to said source of supply, means including a switch operated by said adjustable cam for maintaining the connection of said control circuit to said source of supply and thereafter interrupting said connection after a predetermined movement of said turning means and cam, and means for promptly arresting the movement of said motor and said turning means upon the interruption of said connection.

10. In a resistance line welding machine, an axle having a passageway therein, a roller electrode supported on said axle, a bearing for said axle having a passageway encircling said axle and communicating with a liquid retaining depression in the top portion of said bearing, means for supplying liquid by gravity from said depression to said roller electrode and through said passageway in said axle, a support for said bearing having an encircling liquid retaining depression above said liquid retaining depression in said bearing, a passage between said depression in said support and said depression in said bearing, and means for supplying a cooling liquid to said last-mentioned depression.

11. In a resistance line welding machine, an axle having a longitudinal passageway therein, a roller electrode supported on said axle, a current conducting bearing for said axle having a passageway encircling said axle and communicating with a liquid retaining depression in a top portion of said bearing, means for supplying liquid by gravity from said depression to said roller electrode and through said passageway in said hollow axle, a current conductive support for said bearing having an encircling liquid retaining depression above said liquid retaining depression in said bearing, a passageway between said depression in said support and said depression in said bearing, a current conducting terminal, relatively movable contacts supported on said terminal and on said bearing support, means for supplying electric current to said terminal, and means for supplying a cooling fluid to said terminal and for discharging said fluid into said depression encircling said bearing support.

12. In a resistance line welding machine, an axle having a passageway therein, a roller electrode supported on said axle, a bearing for said axle, a liquid containing basin within which said bearing and axle are supported with at least a portion of said passageway in said axle below the upper edge of said basin, means for supplying liquid to said basin, and means including an outlet in said basin positioned relative to said passageway in said axle for maintaining liquid therein.

13. In a resistance line welding machine, an axle having a passageway therein, a roller electrode supported on said axle, a current conducting bearing for said axle, a current conducting terminal, relatively movable contacts supported on said terminal and on said bearing, a liquid containing basin within which said bearing, said terminal, said contacts, and said axle are supported with at least a portion of said passageway in said axle below the upper edge of said basin, means for supplying liquid to said basin, and means including an outlet in said basin positioned relative to said passageway in said axle for maintaining liquid therein.

14. A resistance line welding machine comprising a frame having arms positioned one above the other, the lower arm being provided with a fluid containing basin, a slide, guides in said upper arm for positioning said slide for vertical movement toward and away from said lower arm, means supported within said frame for operating said slide, inner and outer concentric shafts supported on said slide, a current conducting bearing support attached to the lower end of said outer concentric shaft, a current conducting terminal supported on said slide, relative movable contacts supported on said terminal and on said bearing support, means for biasing said contacts into engagement with one another, a current conducting bearing in said bearing support, a current conducting axle in said bearing, a roller electrode supported on said axle, means for transmitting the rotation of said inner concentric shaft to said axle, said means including a worm supported on said inner shaft and a worm wheel connected with said axle, a second roller electrode positioned below said first-mentioned roller electrode and cooperating therewith, a second current conducting axle on which said second roller electrode is supported, said axle being provided with a passageway therein, a second current conducting bearing for said axle, a second current conducting bearing support for said bearing, a second current conducting terminal, relatively movable contacts supported on said second current conducting terminal and said second bearing support, means for rotatably supporting said second bearing support in said basin in said lower arm with at least a portion of said second axle below the upper edge of said basin, means for supplying a cooling liquid about said first-mentioned current conducting terminal and over said first-mentioned bearing and bearing support to said basin in said lower arm, means including an outlet in said basin in said lower arm for maintaining the liquid level therein above the lower portion of the passageway in said second axle, and means for simultaneously rotating said bearing supports in the same direction through the same angular displacement, said means acting on said first-mentioned bearing support through said outer concentric shaft.

RALPH A. GILBERT.